Aug. 23, 1932.  C. H. TAYLOR  1,873,069
VEHICLE BRAKE
Filed Feb. 4, 1924  6 Sheets-Sheet 3

Witnesses:
W. F. Kilroy
Harry R. L. White

Inventor:
Cecil Hamelin Taylor
By Brown, Boettcher, Dienner
Attys

Aug. 23, 1932.  C. H. TAYLOR  1,873,069
VEHICLE BRAKE
Filed Feb. 4, 1924    6 Sheets-Sheet 5

Witnesses:
W. P. Kilroy
Harry R. L. White

Inventor:
Cecil Hamelin Taylor
Brown, Boettcher & Dienner
Attys

Aug. 23, 1932.          C. H. TAYLOR          1,873,069
VEHICLE BRAKE
Filed Feb. 4, 1924          6 Sheets-Sheet 6

Witnesses:
W. F. Kilroy
Harry C. L. White

Inventor:
Cecil Hamelin Taylor

Patented Aug. 23, 1932

1,873,069

UNITED STATES PATENT OFFICE

CECIL HAMELIN TAYLOR, OF DETROIT, MICHIGAN, ASSIGNOR TO BENDIX BRAKE COMPANY, OF SOUTH BEND, INDIANA, A CORPORATION OF ILLINOIS

VEHICLE BRAKE

Application filed February 4, 1924. Serial No. 690,367.

My invention relates to vehicle brakes, and more particularly to braking systems adapted to brake both the front and rear wheels of motor driven vehicles.

The fundamental object of the invention is to provide a brake system which utilizes the reactionary effort developed in braking the rear wheels for applying the braking effort to the front wheels; also to provide a braking system which will have this action of transmitting the reactive pressure to the front wheel brake whether the car be going forward or backward.

A subordinate object is to secure this result by utilizing the rotative force set up in the normally stationary braking element for actuating the front wheel brake or brakes.

The advantages of the above construction are that it requires an effective braking effort on the rear wheels in order to apply the front wheel brakes; and it makes the pressure applied to the front wheel brakes a function of the braking effort applied to the rear wheels. This avoids the possibility of the front wheel brake mechanism operating in advance to apply a braking effort to the front wheels before the rear wheel brake mechanism is effective, and also avoids the possibility of a greater braking effort being applied to the front wheels than to the rear wheels. Either possibility is undesirable because of its tendency to cause skidding and interfere with steering.

Other objects are to provide an improved construction and mounting of propeller shaft brake for use in the present system; also to provide improved means for transmitting the reactive effort developed in this brake to the front wheel brake or brakes; also to provide a system whereby a heavy vehicle may be easily controlled by slight physical effort on the part of the driver; also to provide a braking system wherein frequent and accurate adjustments to compensate for wear are unnecessary; further to provide a means for operating individual wheel brakes so powerful as to permit the use of simple, elementary brake designs requiring great power, at the wheels, thereby avoiding at a point of intense shock and vibration, delicate, complicated and unreliable mechanism.

In the accompanying drawings, illustrating a preferred embodiment of my invention.

Figure 3:
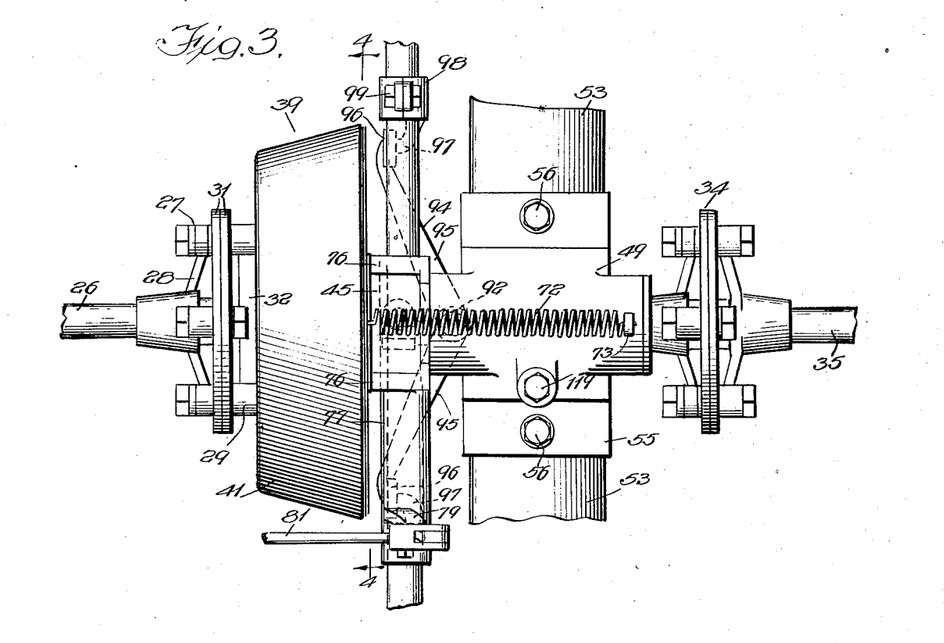
Fig. 3 is a fragmentary plan view on a larger scale of the propeller shaft brake, and the associated linkage which transmits the braking pressure to the front wheels.
Figure 4:
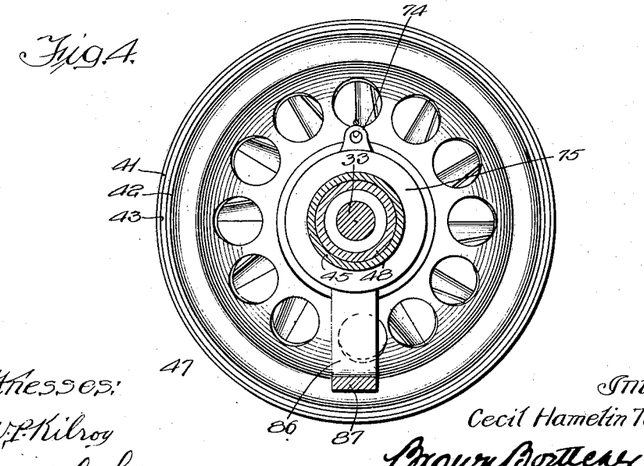
Fig. 4 is a transverse sectional view taken on the planes 4—4 of Figs. 3 and 5.
Figure 5:
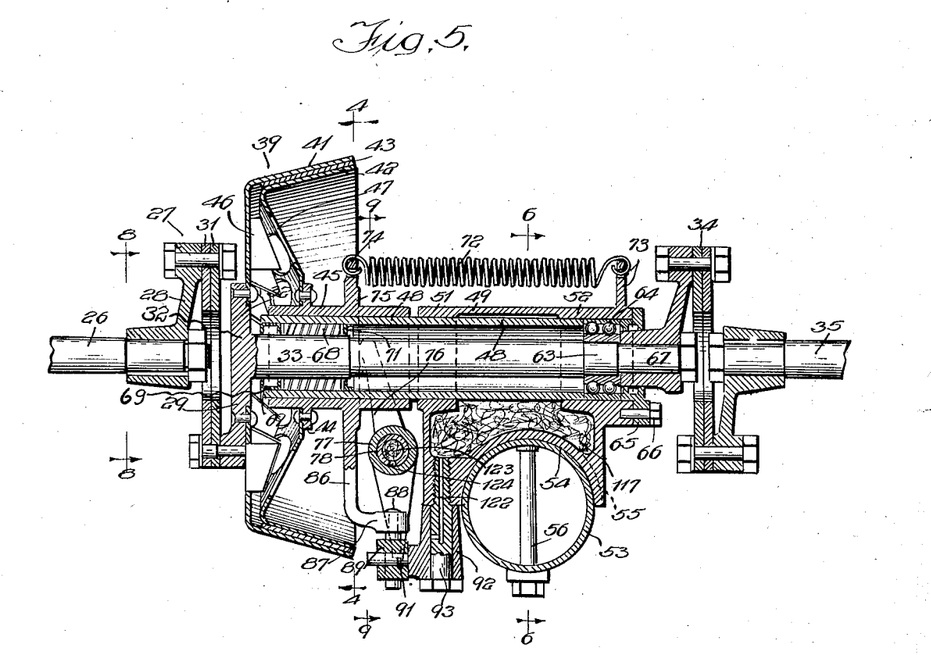
Fig. 5 is a longitudinal sectional view through the propeller shaft brake and the brake actuating mechanism.

The vehicle chassis, designated 14 in its entirety, comprises two side channels 15 connected by transverse cross members 16. The front wheels 17 have their conventional mountings on a front axle 18, and the rear wheels 19 have conventional mounting for a drive from the rear axle 21. For brevity of illustration, the power plant has been represented only by the fly-wheel housing 22 and the transmission housing 23. A stub shaft 24 extends from the rear of the transmission housing 23 and has connection through a universal joint 25 with a shaft 26 which floats between this universal joint 25 and a second universal joint 27 at the end of the shaft. These two universal joints are preferably duplicates, being of any preferred conventional type. The fabric type of joint is inexpensive and as efficient as the majority of other joints. Figs. 3 and 5 illustrate the last joint 27, it being noted that this joint is illustrated as being of the fabric type comprising two spiders 28 and 29 with their offset arms bolted to fabric discs 31.

The spider 29 comprises a flange 32, from the central portion of which extends a shaft 33, in substantial alignment with the shaft 26. This shaft has suitable bearing support at its ends, as I shall presently describe, and its rear end connects with the spider of another universal joint 34, which couples the shaft 33 to the propeller shaft 35. Another universal joint 36 may be interposed between the lower end of the propeller shaft 35 and the shaft entering the differential housing 37. The three shafts, 26, 33 and 35 may all be considered different sections of one common propeller shaft upon which my improved propeller shaft brake and brake system are mounted, the universal joints 27 and 34 being merely interposed in this propeller shaft for the facility of installation and avoiding the necessity of extremely accurate alignment.

The propeller shaft brake unit is designated 39, and it will be observed from Fig. 5 that this brake is generally similar in construction to a cone clutch. The outer female element 41 of the brake consists of a shell having a conical flange, the inner surface of which constitutes the braking surface. The inner, relatively stationary male element 42 has a similar conical flange, the outer surface of which constitutes the braking surface. Either or both of these braking surfaces may be faced with a suitable friction brake lining 43, in the exemplary arrangement shown, the male element having this brake lining. Both brake elements are preferably pressed out of sheet metal, the female brake element 41 being riveted to the flange 32 of the spider 29, and the male element 42 having its web riveted to a flange 44 on a rotatable sleeve 45.

Means may be provided for cooling this propeller shaft brake by utilizing the rotation of the female brake element 41 to set up a circulation of air through the brake. To this end I have shown vanes 46 punched out in a ring around the web portion of the brake element for drawing air from the front side of the brake and projecting it between the brake elements and through a plurality of holes 47 in the web of the inner brake element.

The brake sleeve 45 is rotatably supported upon the forward end of a bearing sleeve 48, which projects forwardly of the bearing housing 49, concentrically of the shaft 33. As viewed transversely in Fig. 6, this bearing housing 49 is of triangular cross section, having a front hub portion 51 and a rear hub portion 52 which form two spaced points of support for the bearing sleeve 48. The bearing sleeve is rigidly secured in the hub portions 51 and 52. The bearing frame or housing 49 is rigidly mounted upon a transverse, tubular strut or cross beam 53, secured at its ends to the longitudinal channels 15—15 of the chassis frame. The under side of the frame or housing 49 is formed with a transverse arcuate recess 54 and curved skirt portions 55, which form a saddle for setting down over the top of the tubular strut 53. The member 49 is rigidly secured to this tubular strut by bolts 56, which pass down through end flanges 57 of the bearing member, through bushings 58, and receive nuts 59 on the bottom side of the tubular strut for rigidly holding the bearing member 49 in place.

Figure 7:
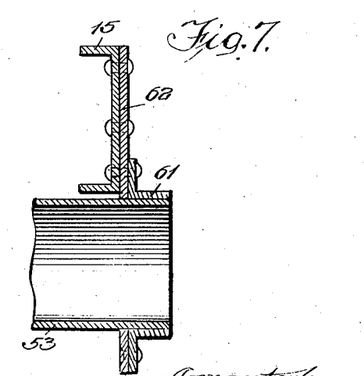
Fig. 7 is a sectional view in continuation of Fig. 6, showing the mounting of the end of the tubular cross strut which braces the chassis frame.
Figures 11, 12:
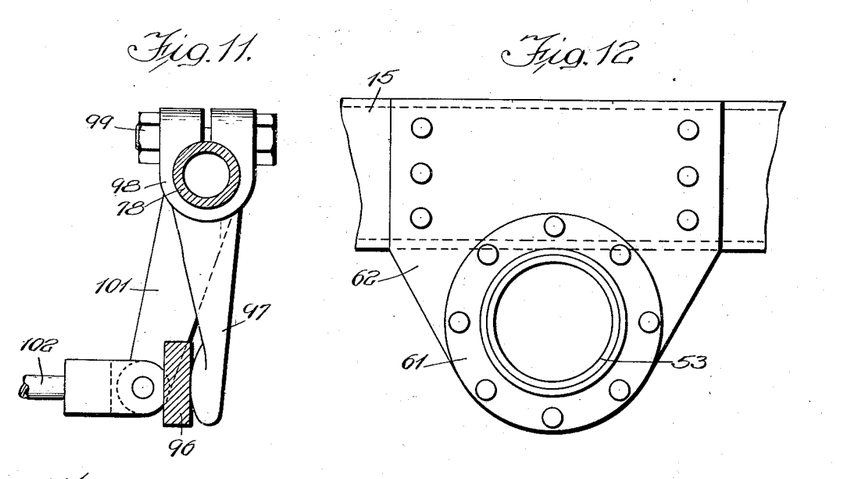
Fig. 11 is a detail sectional view taken on the plane of the line 11—11 of Fig. 9.
Fig. 12 is an end elevational view of the tubular cross strut and its mounting bracket for securing the end of the strut to the chassis frame.

The ends of the tubular strut 53 pass below the frame channels 15, as shown in Figs. 7 and 12, and are secured in flanged collars 61 which are riveted to hanger plates 62. These hanger plates are riveted to the outer sides of their respective frame channels 15.

In providing bearing support for the shaft section 33, the rear end of the shaft is reduced as indicated at 63 for receiving a ball bearing 64 supported in the hub portion 52 between the end of the sleeve 48 and an end closure cap 65. The cap 65 is secured to the hub portion 52 by cap screws 66, and forms an end closure for retaining lubricant in the bearing housing, as well as acting as an abutment shoulder for the bearing 64. The reduced end 67 of the shaft is suitably keyed to the adjacent spider of the universal joint 34. For the other end of the shaft 33, a suitable roller bearing 68 is inserted between the bearing sleeve 48 and the enlarged portion of the shaft 33. Suitable lubricant retaining rings 69 and 71 are arranged at the front and rear ends of the roller bearing 68. It will be evident from the foregoing that this end of the bearing sleeve 48 provides a bearing surface for the shaft 33 and bearing 68 on its inner wall, and a concentric bearing surface for the brake sleeve 45 on its outer surface, thus insuring that the two brake elements 41 and 42 will always be retained in alignment.

Figure 8:
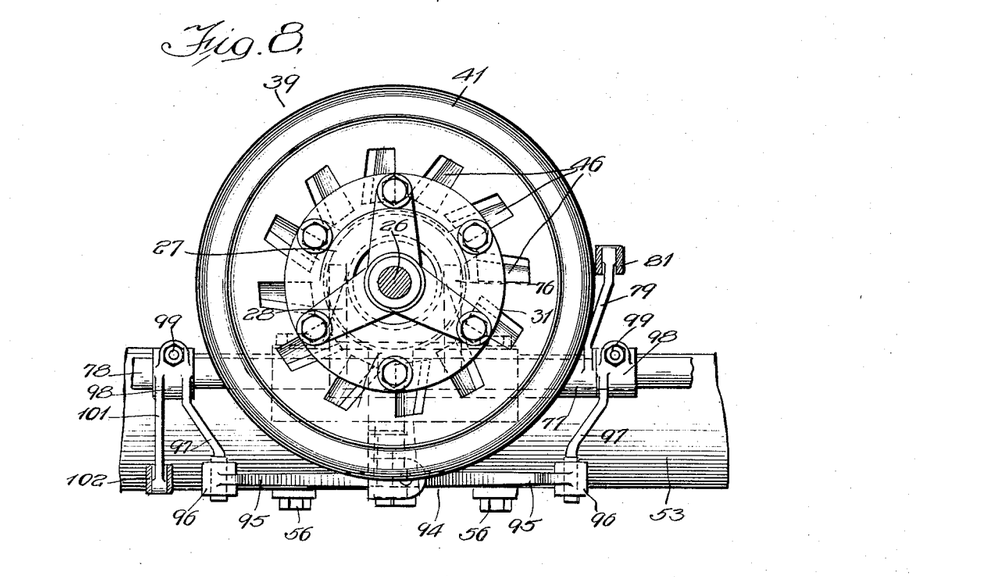
Fig. 8 is a transverse sectional view taken on the plane of the line 8—8 of Fig. 5.
Figure 9:
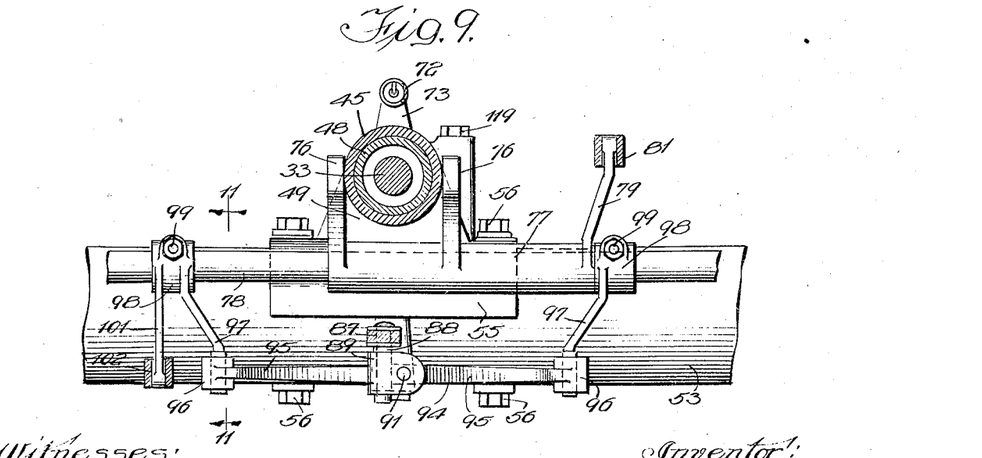
Fig. 9 is another transverse sectional view taken on the plane of the line 9—9 of Fig. 5.

The male element 42 is normally held in retracted position out of braking contact with the female brake element 41 by a tension spring 72. The rear end of this spring is hooked through an aperture in the upper end of an arm 73, rising vertically from the rear end of the bearing housing 49, and the front end of the spring is hooked through an apertured lug 74 projecting upwardly from a collar 75 formed integrally with the sleeve 45. When the propeller shaft brake is to be applied, the sleeve 45 is thrust endwise on the bearing sleeve 48 to force the conical brake element 42 into the rotating brake element 41, this endwise motion of the sleeve 45 being performed through the instrumentality of two arms 76, which are adapted to bear at their upper ends on diametrically opposite points of the collar 75. As shown in Figs. 8 and 9, these shifter arms 76 are formed integral with a sleeve 77 journaled upon another sleeve or tube 78. The shifter arms 76 closely embrace the sides of the sleeve 45 and confine the sleeve 77 against lateral shifting along the sleeve 78. An operating arm 79 extends upwardly from the projecting end of the sleeve 77 (Figs. 8 and 9) and has pivotal connection with an operating rod 81. This operating rod extends forwardly for pivotal connection at 82 with the brake pedal 84 pivoted at any suitable point 85 on the chassis or power plant of the car. Upon depressing the brake pedal 84, it will be apparent that the sleeve 45 and male clutch element 42 will be thrust forwardly under the action of the shifter arms 76, to bring the clutch element 42 into braking contact with the rotating clutch element 41.

It will be apparent that when the braking member 42 is engaged with the rotating brake surface 41 for braking the rear wheels, a reactionary effort will be set up in the brake element 42, tending to rotate the brake element 42 with the rotating braking surface. The reactionary effort opposing this rotation of the brake member 42 will be substantially proportional to the braking pressure exerted between the brake member and brake surface, i. e., when a relatively light braking pressure is exerted between the elements 41 and 42 only a slight reactionary effort will oppose rotation of the brake member 42, but when a considerable braking pressure is applied between the elements 41 and 42, a large reactionary force is set up in any element opposing rotation of the brake member 42.

I utilize this reactionary effort of braking the rear wheels to apply and measure the braking effort transmitted to the front wheels. To this end, an arm 86 is extended from the collar 75 and is formed with a horizontally bent eye 87, through which passes a vertical pivot pin 88. As shown in Fig. 9, this pivot pin extends down through a pivot block 89 in which the pin has free, sliding motion. This pivot block is also pivotally mounted upon a horizontal pivot pin 91, which projects forwardly from a rotatable hub 92. The first pivot pin 88, the pivot block 89 and the second pivot pin 91 constitute a simplified form of universal joint for translating the rotative effort of the brake member 42 into rotative effort applied to the hub 92. This hub 92 is journaled upon a vertically extending headed stud 93, which screws up into the bottom of the bearing housing 49.

Figure 10:
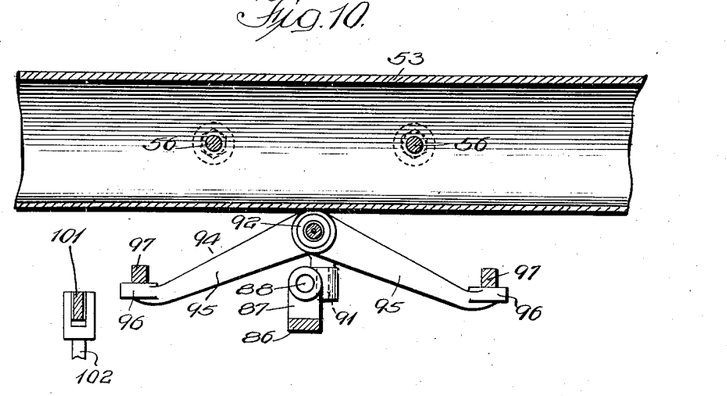
Fig. 10 is a horizontal sectional view showing the yoke or lever which transmits braking pressure to the front wheels, whether the car be going forward or backward.

The hub 92 forms the center of a yoke 94 consisting of two arms 95 extending diagonally from the hub 92, as shown in Figs. 3 and 10. The outer ends of these arms 95 have pads 96 which bear against the lower ends of brake operating levers 97. As shown in Figs. 8, 9 and 11, each of these operating arms 97 is formed integral with a split hub 98 which is rigidly clamped to the sleeve 78 by the bolt 99. It will be noted that by providing the operating member 94 with two arms 95—95, arranged to engage arms 97 as shown, the member 94 will be operative to rock either one arm 97 or the other backwardly in transmitting the reactionary braking effort, no matter whether the car be moving backwardly or forwardly when the propeller shaft brake is applied.

Figure 1:
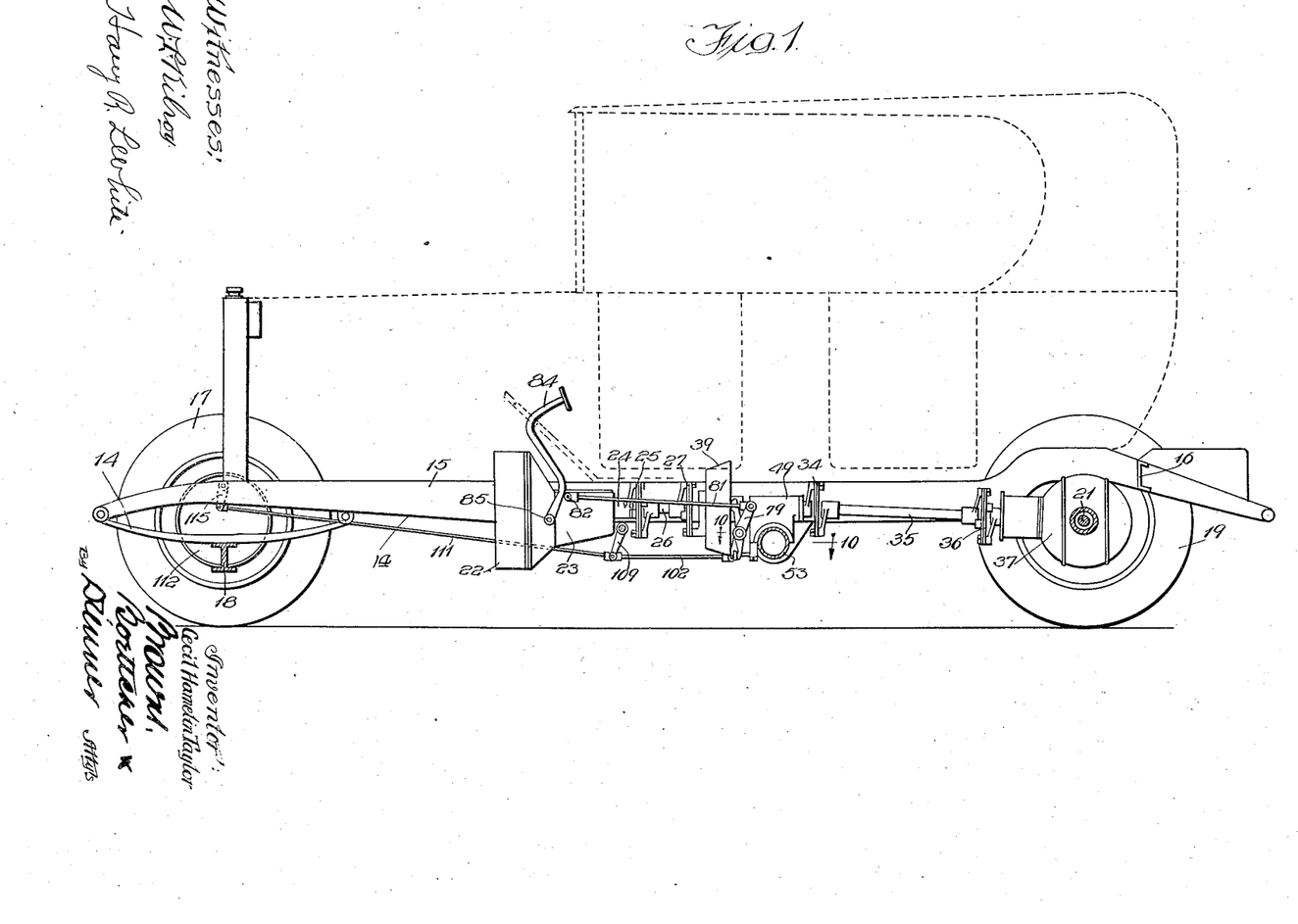
Fig. 1 is a longitudinal sectional view through a typical automobile chassis to show the location of my improved mechanism in the driving train, the tonneau of the car being illustrated in dotted lines.
Figure 2:
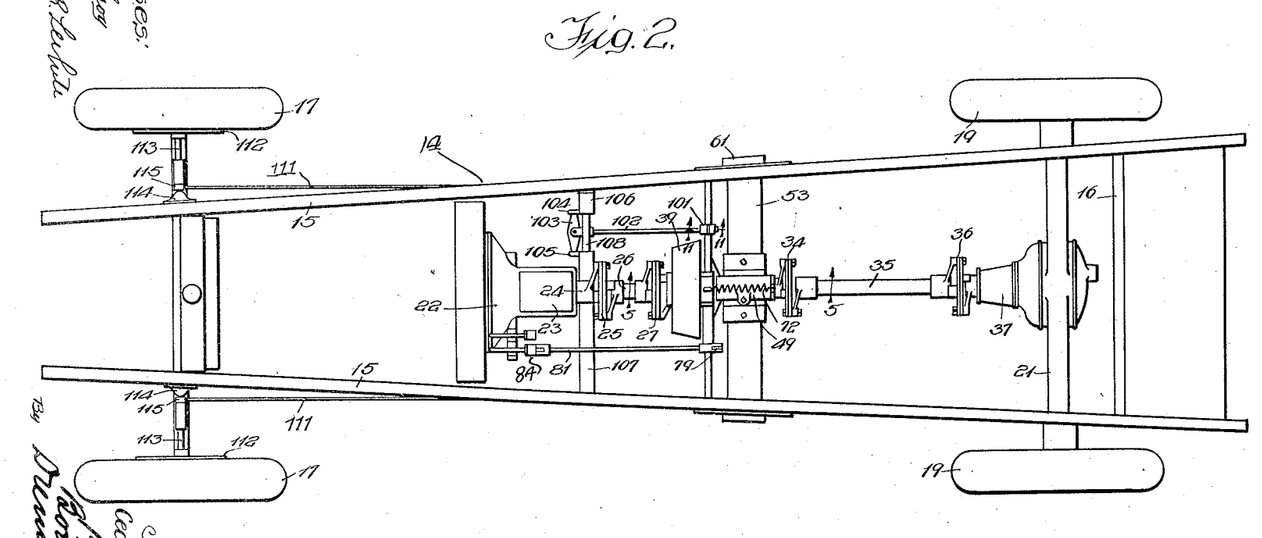
Fig. 2 is a plan view of the chassis.

An operating lever 101 extends down from the left-hand hub 98 (as viewed in Figs. 8 and 9) and the lower end of this operating lever has pivotal connection with an operating rod 102 extending forwardly and making pivotal connection with an equalizing beam 103 (Fig. 2). The ends of this equalizer beam 103 have pivotal connection with arms 104 and 105 exending down from sleeves 106 and 107, respectively. Both sleeves are mounted axially upon a shaft 108, both sleeves being free to rotate on this shaft, or, if desired, one of the sleeves being fixed to the shaft for rotating the same therewith. Projecting downwardly from the outer end of each sleeve 106 and 107 is an arm 109 (Fig. 1) which has pivotal connection with an operating rod 111 extending up to the front wheel brake on its particular side of the car. The front wheel brakes may be of any preferred conventional design. A typical design is illustrated in Figs. 1 and 2, wherein the brake 112 of each front wheel is provided with an actuating shaft 113 extending laterally from the upper part of the non-rotating end plate of the brake housing. The inner end of each of these actuating shafts is supported upon a universal joint 114, which is secured to the frame channel or side of the radiator frame. These universal joints 114 permit the shafts 113 to follow the wheels 17 in their up and down movements relative to the chassis frame. An arm 115 has operative connection with each of the shafts 113 and extends down for making a pivotal connection with the operating rod 111 individual to its wheel.

The front wheel brakes may have the restoring springs which restore the parts to their normal positions embodied directly in the brake drums 112, or these restoring springs may be connected to any of the operating linkage. These springs will move both operating arms 97 back into operative association with the ends of the yoke or rocker member 94, after the pedal 84 is released. The spring 72 will also retract the brake element 42 at this time. It will be noted that this spring 72 will follow the brake element in its limited rotational movement in either direction, and will exert a continuous tension tending to bring the brake element back to its normal position with the lug 74 uppermost.

Figure 6:
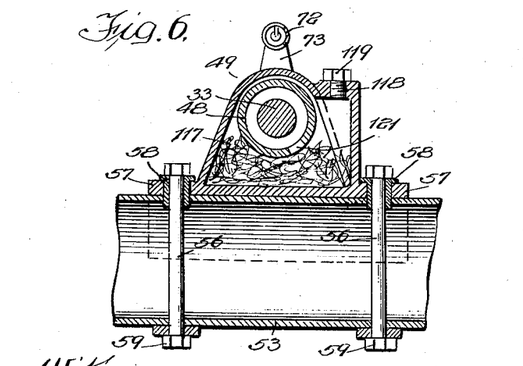
Fig. 6 is a transverse sectional view taken on the plane of the line 6—6 of Fig. 5.

For lubricating the bearings 64 and 68 of the propeller shaft brake and its section of shaft 33, there is provided a lubricant chamber 117 in the bearing housing 49, which lubricant chamber surrounds the stationary sleeve 48 intermediate the hub portions 51 and 52. This chamber is adapted to be filled with waste for soaking up and retaining a considerable volume of lubricant which is poured into the chamber 117 through a port 118 in the upper part of the chamber (Fig. 6), closed by a removable plug 119. As shown in Fig. 6, the stationary sleeve 48 is provided with a port 121 in its lower side for permitting the entrance of the lubricant into this sleeve for distribution along the inner walls of the sleeve to the front bearing 68 and the rear bearing 64. The lubricant in this chamber 117 also feeds down through an oil passageway 122 in the vertical pivot stud 93 for lubricating the bearing surfaces of the pivot stud and the hub 92. The interior of the transverse operating sleeve 78 may also be filled with waste 123 containing a lubricant for seepage down through holes 124 into the bearing surfaces between the sleeves 77 and 78.

It will be seen that as a result of the foregoing construction, the front wheel brakes will be applied each time the rear wheel brakes are applied, whether the car be moving forwardly or backwardly. Also, because the front wheel braking effort is the reactionary effort of braking the rear wheels, there is no possibility of applying the front wheel brakes without applying the rear wheel brakes; and, moreover, this arrangement insures that the braking effort applied to the front wheels will bear a predetermined ratio to the braking effort applied to the rear wheels.

I do not intend to be limited to the particular details herein shown and described.

I claim:

1. The combination with an automobile having front and rear wheels and a propeller shaft, of a front wheel brake, a brake drum rotating with said propeller shaft, a brake member aligned with said brake drum, operating means for shifting said brake member axially into engagement with said brake drum, said brake member having limited rotational motion in each direction corresponding to the rotation of said brake drum, a yoke, a universal joint transmitting the rotational motion of said brake member to said yoke, levers adapted to be engaged by the ends of said yoke operatively connected to a common operating member, and means for transmitting motion from said common operating member to said front wheel brakes.

2. The combination with an automobile having front and rear wheels and a propeller shaft, of a brake for each front wheel, a braking device mounted on said propeller shaft, a brake member mounted concentrically of said propeller shaft, pedal operating means for shifting said braking device and said brake member together axially of said propeller shaft, said brake member having a limited rotational motion in either direction corresponding to forward or backward motion of the vehicle, a yoke centrally pivoted, a universal joint for transmitting the rotational motion of said brake member to said yoke, a shaft member, operating arms extending from said shaft member adapted to be engaged by the ends of said yoke, an equalizer, means for transmitting motion from said shaft member to said equalizer, and means for transmitting motion from the ends of said equalizer to the brake for each front wheel.

3. In an automobile, the combination of a bearing frame, a sleeve mounted in said frame and extending therefrom, a propeller shaft extending through said sleeve, a first anti-friction bearing between said bearing frame and said shaft, said sleeve being stationary and having one end serving as an abutment for said first bearing, a second anti-friction bearing interposed between said shaft and said stationary sleeve adjacent the other end thereof, a female brake element having a conical braking surface secured to said shaft, a co-operating male brake element having a conical braking surface, a second sleeve slidably and rotatably mounted over said first sleeve adjacent the latter end thereof, said male brake element being supported by said second sleeve, and operating means for sliding said second sleeve axially.

4. In combination, a driven shaft, a brake, a brake element provided with a braking surface and adapted to rotate with the said driven shaft, a brake member adapted to be moved into and out of engagement with the said brake element, means connected to the said brake member for moving it into and out of engagement with the said brake element, said brake member being rotatable with the said braking surface when in engagement therewith, and means pivotally connected to the said brake member for utilizing the rotation of the said brake member for actuating the said brake.

5. In combination, a rear wheel, a front wheel, a brake for the said front wheel, a brake element provided with a braking surface and adapted to rotate with the said rear wheel, a brake member adapted to be moved into and out of engagement with the said brake element, means connected to the said brake member for moving it into and out of engagement with the said brake element, said brake member being rotatable with the said braking surface when in engagement therewith, and means pivotally connected to the said brake member for utilizing the rotation of the said brake member for actuating the brake associated with the said front wheel.

6. In combination, a driven shaft, a brake, a brake element provided with a braking surface and adapted to rotate with the said driven shaft, a brake member adapted to be moved into and out of engagement with the said brake element, a second shaft, an element pivotally mounted on the said second shaft at one end and straddling a portion of said brake member at its other end, means for pivoting the said element about the said second shaft to cause it to move the said brake member into and out of engagement with the said brake element, said brake member being rotatable with the said braking surface when in engagement therewith, and means pivotally connected to the said brake member for utilizing the rotation of the said brake member for actuating the said brake.

7. In combination, a driven shaft, a brake, a brake element provided with a braking surface and adapted to rotate with the said driven shaft, a brake member adapted to be moved into and out of engagement with the said brake element, a second shaft, an element pivotally mounted on the said shaft at one end and straddling a portion of the said brake member at its other end, means for pivoting the said element about the said shaft to cause it to move the said brake member into and out of engagement with the said brake element, said brake member being rotatable with the said braking surface when in engagement therewith, a yoke, means pivotally connecting the said yoke with the said brake member, means connecting the said yoke member with the said second shaft, and means connecting the said second shaft with the said brake, the said yoke being adapted to utilize the rotation of the said brake member for actuating the said brake.

8. The combination with an automobile having front and rear wheels and a propeller shaft, of a front wheel brake, a brake drum on said propeller shaft, a brake member adapted to engage the said brake drum, a lever pivoted substantially centrally, means connecting the said lever with the said brake member adapted to swing said lever in either direction upon rotational movement of said brake member, and mechanism engaging the opposite ends of the said lever for transmitting motion therefrom to the said front wheel brake.

9. The combination with an automobile having front and rear wheels and a propeller shaft, of a brake for each front wheel, a braking device rotatable with the said propeller shaft, a brake member, operating means for shifting said member into cooperation with said braking device, said brake member having a limited rotational motion in either direction corresponding to the forward or backward motion of the vehicle, a lever centrally pivoted, means for transmitting the rotational motion of said brake member to said lever, a shaft member, operating means extending from said shaft member adapted to be engaged by the end of the said lever, and means for transmitting motion from the end of said shaft member to the brake for each front wheel.

10. In combination, a brake element provided with an internal braking surface, a brake member telescoping the said brake element and adapted to be moved into and out of engagement with the said braking surface, a plurality of vanes associated with the said brake element, said brake member being equipped with a plurality of holes opposite the said vanes, and means for rotating the brake element, the said vanes upon rotation being adapted to draw air from the outside of the brake element and to project it through the holes in the said brake member, cooling both the brake element and member.

11. In an automobile, the combination of a driving wheel and a guiding wheel, a brake for said driving wheel comprising a rotating element and a torque resisting element, the said torque resisting element being equipped with a plurality of apertures, a plurality of vanes in the said rotating element opposite the said apertures in the said rotating element adapted to project air through the said aperture to cool the brake, a brake for said guiding wheel, and means for operating said latter brake with the torque reaction of the said torque resisting element.

12. In combination, a brake, a brake element, a brake member cooperable therewith, means for moving said member into cooperation with said element, a lateral extension fastened to said member, a pivotal mounting for the free end of said extension and a connection between said mounting and said brake adapted to utilize the rotation of said brake member for actuating said brake.

In witness whereof, I hereunto subscribe my name this 26th day of January, 1924.

CECIL HAMELIN TAYLOR.